F. S. CARR.
SEPARABLE FASTENER.
APPLICATION FILED JAN. 16, 1920.

1,387,109.

Patented Aug. 9, 1921.

Inventor:
Fred S. Carr,
by Emery Booth Janney Varney
Attys.

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

SEPARABLE FASTENER.

1,387,109.  Specification of Letters Patent.  Patented Aug. 9, 1921.

Application filed January 16, 1920. Serial No. 351,775.

*To all whom it may concern:*

Be it known that I, FRED S. CARR, a citizen of the United States, and resident of Newton, in the county of Middlesex and Commonwealth of Massachusetts, have invented an Improvement in Separable Fasteners, of which the following description, in connection with the accompanying drawings, is a specification, like characters on the drawings representing like parts.

This invention pertains to improvements in separable fasteners, and more particularly, though not exclusively, to that class of separable fasteners peculiarly well adapted for fastening of vehicle curtains and the like, and in which stud and socket are separable by relatively tipping movement in at least one direction, while being locked against separation by tipping movement in at least one other direction.

It is among the objects of the invention to provide a separable fastener of simple construction.

In the drawings, which show a preferred embodiment of one illustrative form of my invention:

Figure 1:
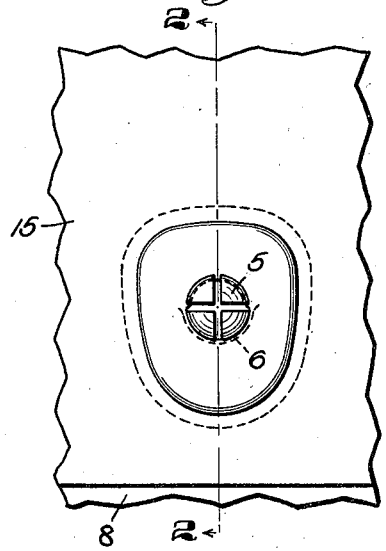
Figure 1 is a front elevation of a portion of an automobile curtain having one form of my improved fastener attached thereto.

Referring to the drawings and to the preferred form of my invention selected for illustrative purposes, I have shown a stud preferably rendered resilient, as shown, by being slotted longitudinally and providing a head 5 and a primary neck 6 and a secondary neck 7'. The stud is preferably of the general form shown in my co-pending application, Serial No. 351,773, filed herewith, in which the slots terminate in the base 7 of the stud so that the resiliency of the stud initiates in the base. The preferred form of stud herein shown is secured to its carrier, herein shown as a portion of an automobile body 8, by a screw or the like 9 secured to and projecting from the base of the stud, the screw 9 preferably having a head 11 secured to the base of the stud, but spaced from the resilient portion thereof so that the head of the stud will not interfere with the spring of the base which contributes to the expansion and contraction of the stud proper. I preferably space the head 11 of the screw from the spring base 7 by providing the base of the stud with an enlarged portion 12, preferably providing flats corresponding to the flats on the head 11 of the screw 9 so that a wrench applied to the exterior of the polygonal base 12 will turn the screw 9. The spring base 7 may be somewhat offset from the polygonal base 12 and be of different contour, herein shown as round, thus preventing the interference of the head 11 of the screw 9 with the spring of the base 7.

Figure 2:
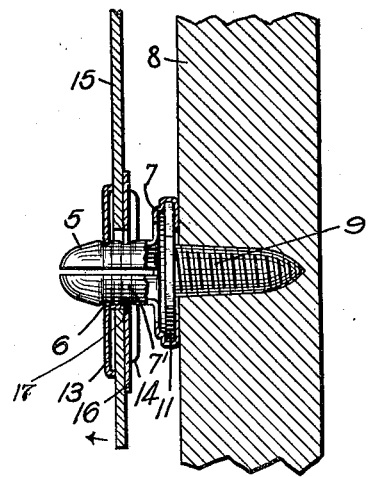
Fig. 2 is a section on the line 2—2 of Fig. 1.
Figure 3:
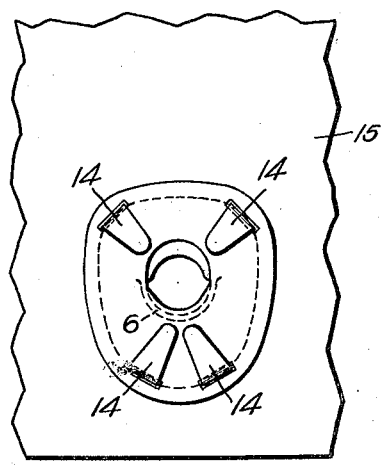
Fig. 3 is a rear elevation of the socket shown in Figs. 1 and 2.
Figure 4:
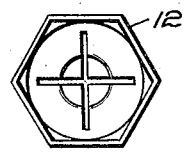
Fig. 4 is an end elevation of the preferred form of stud shown in Fig. 2.

The socket illustrated in connection with the preferred form of my invention includes a front plate 13 having an aperture therethrough adapted to permit passage of the head 5 of the stud when the latter is contracted, the aperture preferably being proportioned so as to hug the bottom of the periphery of the neck 6. The front plate 13 may be provided with prongs 14 passing through the fabric 15 and clenched over a back plate 16 which also provides a stud-receiving aperture, which is preferably somewhat elongated to permit relative tipping of stud and socket in one direction only, and which preferably includes a lip 17 adapted to enter the secondary neck or groove 7' of the stud, thus opposing separation of the stud and socket by rectilinear relative movement in a direction axial of the stud, while permitting separation of stud and socket by a tipping movement arising from a pull on the bottom of the socket in the direction of the arrow shown in Fig. 2.

The socket construction hereinbefore described admits of positioning the front plate 13 and the back plate 16 relatively close together, and permits the use, if desired, of a relatively short stud.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A separable fastener comprising, in combination, a resilient stud having a head and having two recessed portions, a socket providing a front plate having an aperture therein of such size as to permit the passage of the contracted head of the stud therethrough and adapted to embrace the forward recessed portion of the stud, said socket also providing a back plate having an aperture therein through which the stud passes, said back plate having in the general plane thereof a jaw for engagement with the second reduced portion of the stud.

2. A separable fastener comprising, in combination, a resilient stud having a head and having two recessed portions, a socket providing a front plate having an aperture therein of such size as to permit the passage of the contracted head of the stud therethrough and adapted to embrace the forward recessed portion of the stud, said socket also providing a back plate having an aperture therein through which the stud passes, said back plate having in the general plane thereof a jaw for engagement with the second reduced portion of the stud, said front plate and back plate located on opposite sides of the socket-carrying fabric.

3. A separable fastener comprising, in combination, a resilient stud having a head and having two recessed portions, a socket providing a front plate having an aperture therein of such size as to permit the passage of the contracted head of the stud therethrough and adapted to embrace the forward recessed portion of the stud, said socket also providing a back plate having an aperture therein through which the stud passes, said back plate having in the general plane thereof a jaw for engagement with the second reduced portion of the stud, said front plate and back plate located on opposite sides of the socket-carrying fabric and secured together by prongs on one of the plates passing through the fabric and clenched over the other of said plates.

4. A stud for separable fasteners comprising, in combination, a head and a neck, a shank portion and a base portion, said stud slotted axially by slots terminating in the base portion, the resiliency of the stud initiating in the base portion, and means for fastening a securing part to the base of said stud while maintaining the resiliency of said base.

5. A split stud for separable fasteners having a base flange slotted to provide resiliency and a securing part having a head secured to said stud rearwardly of said slotted base flange and spaced therefrom adjacent the resilient portion thereof.

6. A split stud for separable fasteners having a base flange slotted to provide resiliency and a securing part having a head secured to said stud rearwardly of said slotted base flange and spaced therefrom adjacent the resilient portion thereof, said head having a peripheral contour differing from the interior peripheral contour of said base flange.

7. A split stud for separable fasteners having a base flange slotted to provide resiliency and a securing part having a head secured to said stud rearwardly of said slotted base flange and spaced therefrom adjacent the resilient portion thereof, said head non-circular and closely fitting a surrounding portion of the stud to permit turning of the parts together by force applied to the stud or parts integral therewith.

In testimony whereof, I have signed my name to this specification.

FRED S. CARR.